United States Patent
Hancock-Bogese et al.

[11] Patent Number: 6,113,076
[45] Date of Patent: Sep. 5, 2000

[54] WILDLIFE BARRIER

[75] Inventors: Sharon Hancock-Bogese; Stephen Bogese, II; Kevin Crawley, all of Salem, Va.

[73] Assignee: Viriginia Plastics Company, Inc., Roanoke, Va.

[21] Appl. No.: 08/752,939

[22] Filed: Nov. 21, 1996

Related U.S. Application Data

[63] Continuation of application No. 08/543,483, Oct. 16, 1995, abandoned, which is a continuation-in-part of application No. 08/266,724, Jun. 27, 1994, abandoned.

[51] Int. Cl.[7] ............................ E04H 17/00; E04H 17/14; E04H 17/02
[52] U.S. Cl. .................................. 256/1; 256/19; 256/50; 52/761; 52/483.1
[58] Field of Search ...................... 256/1, 19, 45, 256/50; 52/309.1, 728, 761, 483.1; 119/502, 512, 513, 52.3, 57.9; 428/907

[56] References Cited

U.S. PATENT DOCUMENTS

| | | | |
|---|---|---|---|
| 542,675 | 7/1895 | Braley | 52/728 X |
| 2,768,607 | 10/1956 | McClure, Jr. | 119/502 X |
| 3,321,924 | 5/1967 | Liddell | 428/907 X |
| 4,287,637 | 9/1981 | Bernardi | 256/1 |
| 4,462,141 | 7/1984 | Bogese | 24/16 PB |
| 4,555,866 | 12/1985 | Stone | 428/907 X |
| 4,723,761 | 2/1988 | Cluff | 256/34 |
| 4,896,864 | 1/1990 | Nusbaum | 256/1 X |
| 5,201,497 | 4/1993 | Williams et al. | 256/45 X |

FOREIGN PATENT DOCUMENTS

| | | | |
|---|---|---|---|
| 2532572 | 11/1976 | Germany | 256/1 |
| 2843639 | 4/1980 | Germany | 256/1 |

OTHER PUBLICATIONS

Letter dated Feb. 8, 1993 from Sharon Hancock to Tim Kosir.
Purchase Order No. 08243–875437 from Border States Elec. Supply to Virginia Plastics Co.

*Primary Examiner*—Anthony Knight
*Assistant Examiner*—Robert L. Pilaud
*Attorney, Agent, or Firm*—SAIDMAN DesignLaw Group

[57] ABSTRACT

A sheet of plastic used with a perimeter structure (e.g., fence) to prevent certain animals from climbing up the fence. The sheet of plastic is characterized by a smooth, slippery surface so that animals are unable to obtain a foothold on the sheet. Apertures may be preformed in the plastic sheet for permitting a fastener to be coupled to the sheet to enable the sheet to be mounted to the outside surface of the perimeter fence. Backing strips having preattached fasteners may be placed on the inside surface of the fence to facilitate attachment of the plastic sheet on the outside surface and to permit some degree of natural movement thereof after installation. The plastic sheet preferably comprises polyethylene having a thickness between about 0.050–0.060 inches.

33 Claims, 10 Drawing Sheets

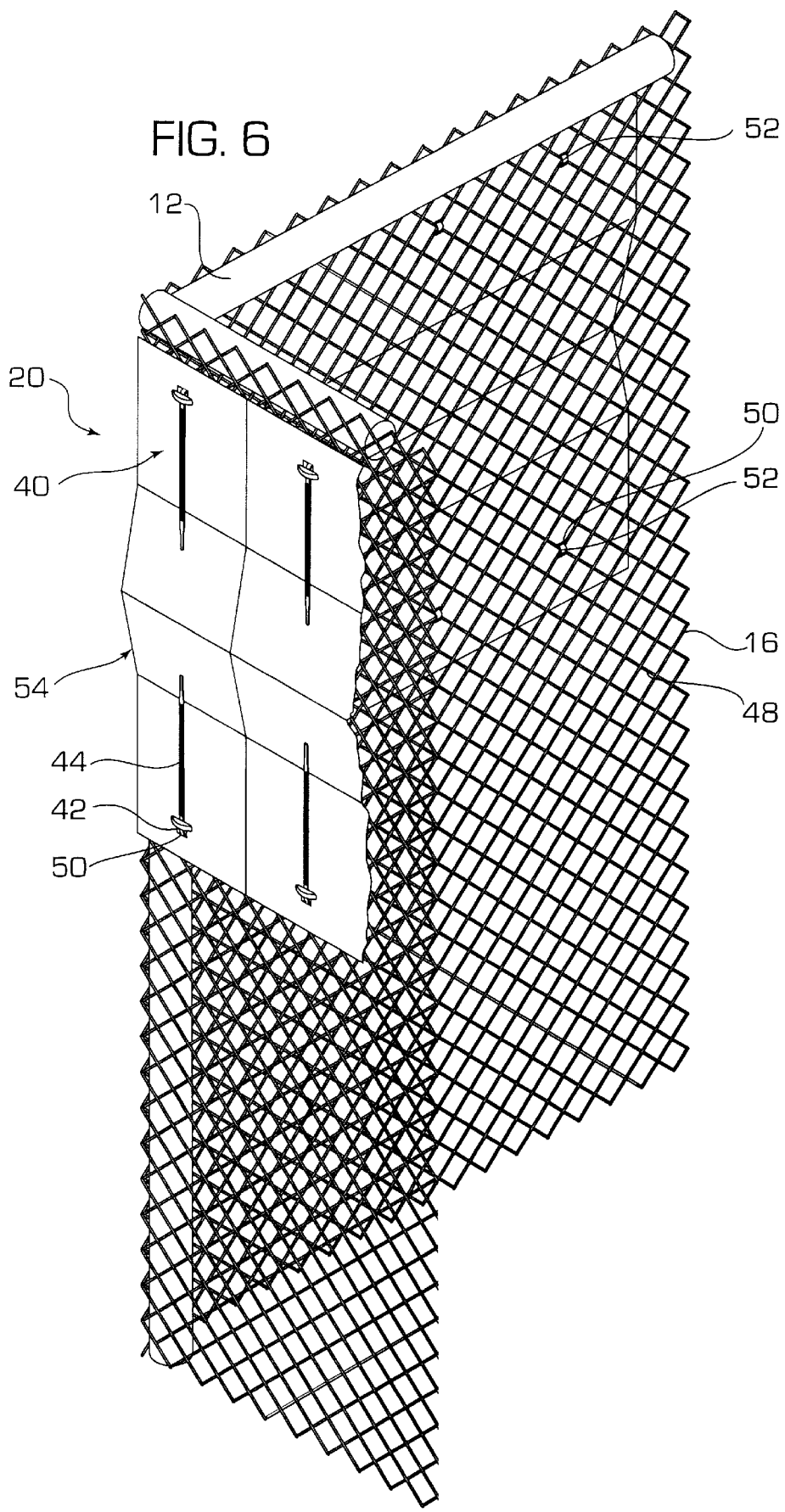

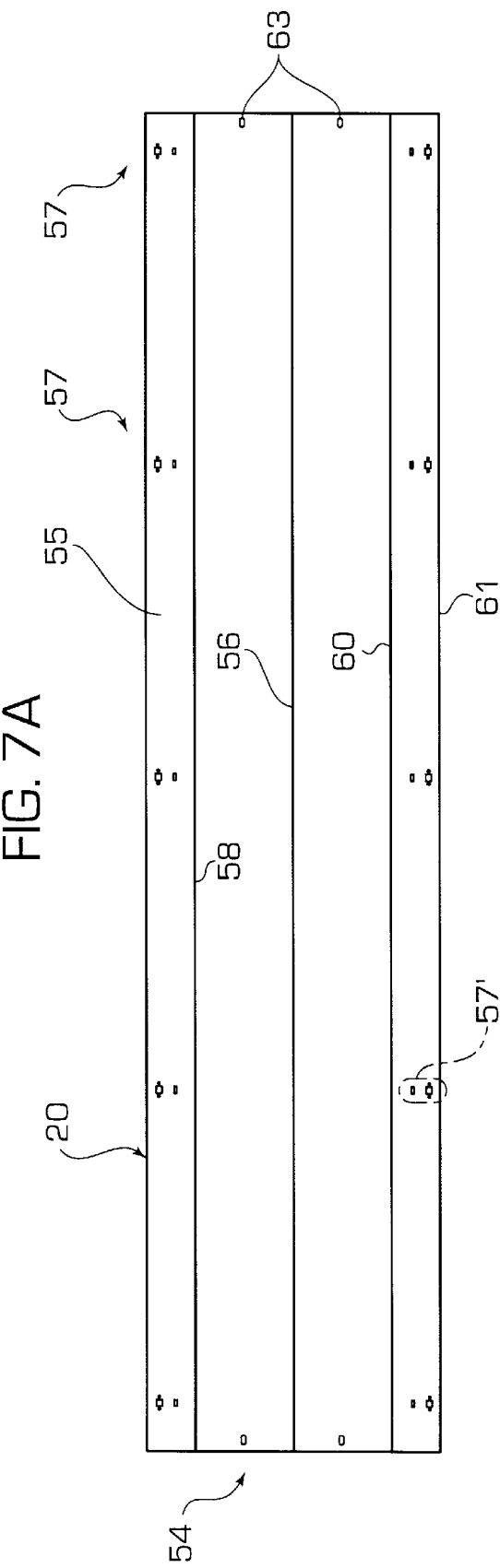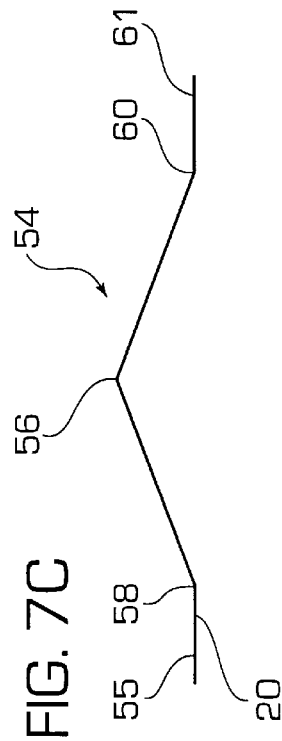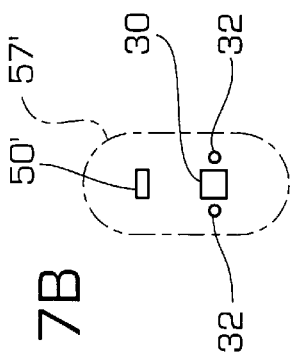

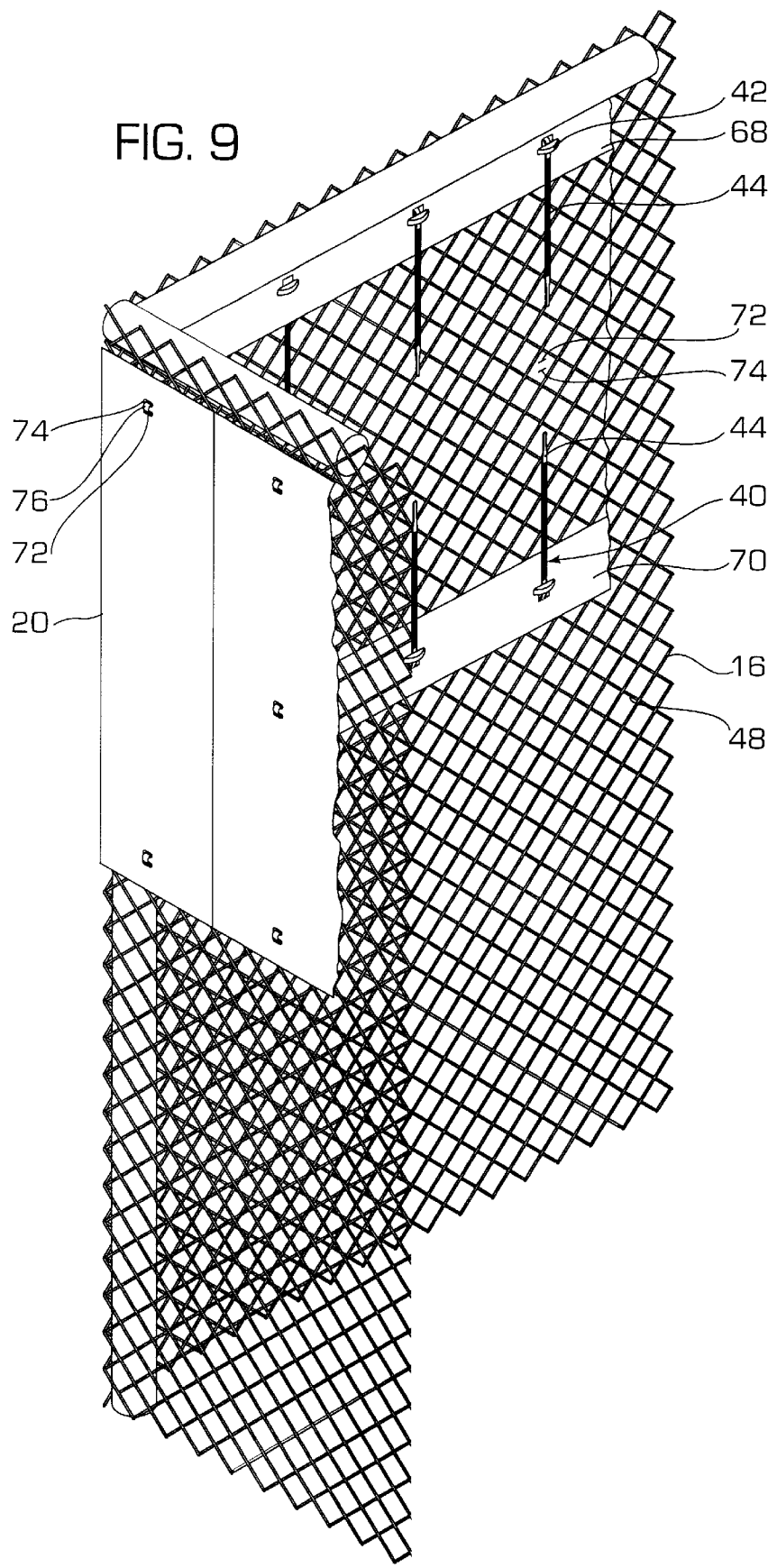

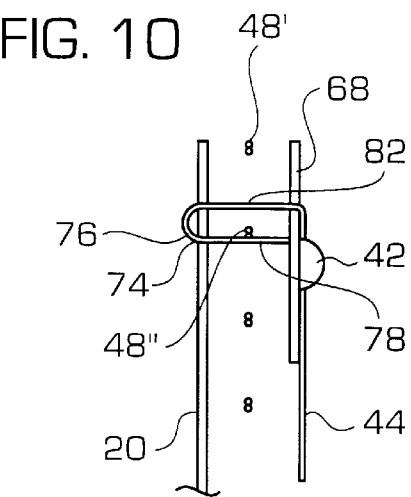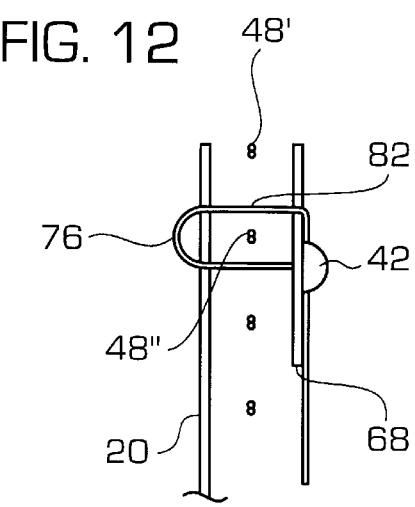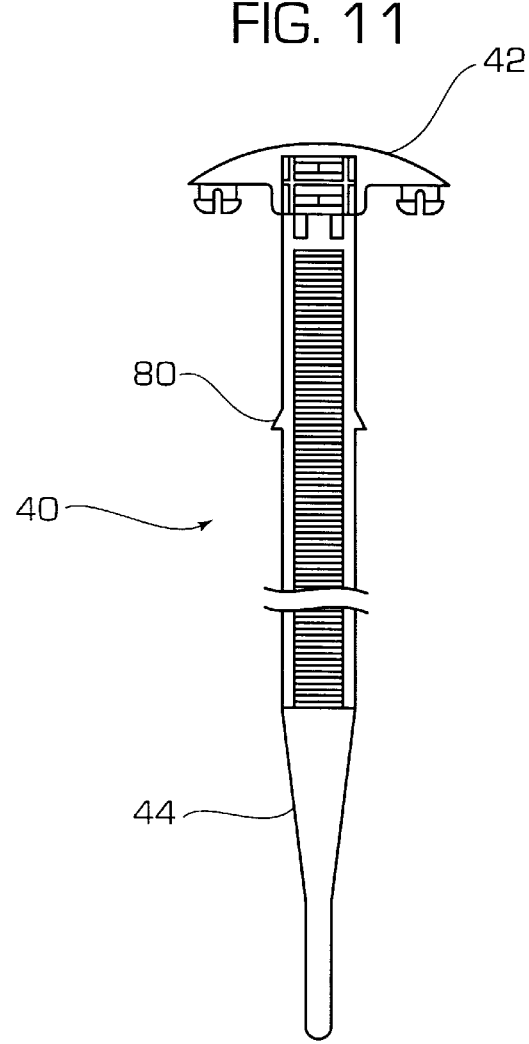

WILDLIFE BARRIER

CROSS-REFERENCE TO RELATED APPLICATION

This application is a continuation of application Ser. No. 08/543,483, filed Oct. 16, 1995, now abandoned, which is a continuation-in-part of prior application Ser. No. 08/266,724, filed Jun. 27, 1994, abandoned.

BACKGROUND OF THE INVENTION

1. Field of the Invention

This invention relates to a wildlife barrier and, more particularly, is directed towards apparatus useable with a fence (or other perimeter structure) to prevent certain animals from climbing the fence.

2. Description of Related Art

High voltage power substations are generally surrounded by a perimeter structure such as a fence. Most frequently, such fences are of the chain link variety and are designed to keep out intruders from the sensitive and potentially dangerous equipment located within the perimeter of the fence.

Frequently, however, intruders of the four-legged variety, such as, for example, squirrels, do not find chain link fences to present much of an obstacle. Indeed, the criss-crossed links of the fence form an ideal foothold for such animals, and can normally be easily climbed.

If, after scaling the perimeter fence, an animal has the misfortune of coupling itself between a high voltage line and a ground or neutral line, not only will the animal be electrocuted, but an area wide blackout could occur.

Other sensitive facilities may also be surrounded by chain link or other fences or walls which similarly would not present much of an obstacle to small animals who can easily climb same. Wooden fences and cinderblock walls are typical of such other structures which are also subject to being climbed by such animals.

It would be highly desirable if something could be provided to prevent such animals from easily climbing the surrounding fences or walls, without doing harm to the animals. It is towards this end that the present invention is advanced.

OBJECTS AND SUMMARY OF THE INVENTION

It is therefore a primary object of the present invention to provide a wildlife barrier which may be used with a perimeter structure (e.g., fence, wall, barricade, etc.) to prevent certain animals from climbing up the structure.

Another object of the present invention is to provide a wildlife barrier which is inexpensive to manufacture and easy to install.

A further object of the present invention is to provide a wildlife barrier which may be used to prevent animals from climbing up a fence or other structure, but which does not harm the animals in any way.

A still further object of the present invention is to provide a wildlife barrier which may be manufactured together with means for attaching same to a fence or other structure, whereby attachment of the barrier to the fence or other structure may be facilitated.

A still further object of the present invention is to provide a wildlife barrier which may be attached to a fence or other structure using any of a variety of different attaching means.

A further object of the present invention is to provide a wildlife barrier which provides an inexpensive yet effective way to reduce blackouts from high voltage power substations.

A still further object of the present invention is to provide a wildlife barrier which has a built in mechanism for minimizing structural variations due to temperature changes.

Another object of the present invention is to provide a wildlife barrier and a method for mounting same to a perimeter structure such as a chain link fence which takes into account normal expansion of the barrier due to temperature changes.

The foregoing and other objects are achieved in accordance with one aspect of the present invention through the provision of apparatus used with a perimeter structure to prevent certain animals from climbing up the perimeter structure. The apparatus preferably comprises a sheet of plastic which may be mounted to the outer surface of the perimeter structure. The sheet is characterized by having a smooth, slippery surface so that the animals are unable to obtain a foothold thereon.

In accordance with another aspect of the present invention, the plastic sheet preferably includes aperture means preformed therein for permitting a fastener to be secured thereto in order to enable the sheet to be mounted to the outer surface of the fence or other structure. In one embodiment, the aperture means may comprise a first row of apertures formed near the upper edge of the sheet, while in an alternate embodiment, a second set of apertures may be formed near the lower edge of the sheet.

In accordance with more particular aspects of the present invention, the aperture means may comprise a plurality of elongated slots, and the perimeter structure may comprise a chain link fence. Fastener means may comprise a plurality of flexible plastic straps attached respectively to preformed apertures in said sheet. The straps are adapted to be looped around one or more links of the chain link fence for securing the plastic sheet thereto.

In an alternate embodiment, a first backing strip may be mounted on the inside surface of the fence adjacent the upper edge of the plastic sheet, and the fastener means comprises a flexible plastic strap mounted to apertures formed in the backing strip. The strap extends from the backing strip to be looped through apertures formed in the plastic sheet. A second backing strip may be mounted on the inside surface of the fence adjacent the lower edge of the plastic sheet, and a plurality of flexible plastic straps may be mounted to the second backing strip for securing same to the plastic sheet through the fence.

In accordance with another aspect of the present invention, the plastic sheet further may include means formed therein for minimizing the formation of vertical undulations in the sheet. Such means preferably comprise a V-shaped groove extending horizontally across the plastic sheet.

In accordance with yet another embodiment of the present invention, the aperture means may comprise a plurality of aperture sets, each of the aperture sets comprising a medium to large shape (e.g., square) aperture and at least one smaller aperture (e.g., round) located on one or more sides of the larger aperture. Once again, the aperture sets may be located either along the upper edge of the sheet and/or along the lower edge of the sheet.

In accordance with more specific aspects of the present invention, the plastic sheet preferably comprises polyethylene, and is approximately 0.050–0.060 inches thick.

In accordance with yet another aspect of the present invention, an apparatus is provided which comprises a sheet of semi-rigid plastic having a slippery outer surface and an upper edge, apertures formed along the upper edge of the plastic sheet, and fasteners coupled to the apertures of the plastic sheet for facilitating mounting of the sheet to a fence or other perimeter structure.

In accordance with yet another aspect of the present invention, the foregoing apparatus is further provided in combination with a perimeter structure such as a chain link fence to a portion of which the sheet is mounted by means of the fasteners. The fasteners preferably comprise a plurality of flexible plastic straps that are looped around the links of the chain link fence so as to fasten the plastic sheet thereto.

Alternatively, there may be provided a first backing strip mounted on the inside surface of the chain link fence, the flexible mounting straps coupling the backing strip to the plastic sheet. More particularly, the flexible plastic straps may be mounted to apertures formed in the backing strip, the apertures along the upper edge of the sheet receiving the flexible plastic straps. Additionally, a second backing strip may be provided on the inside surface of the fence, and a plurality of flexible plastic straps may be mounted to the second backing strip for securing same to the plastic sheet through the fence.

In one embodiment, the flexible plastic straps extend through the central open area between the links of the chain link fence so as to permit some degree of movement of the plastic sheet after installation. Such movement often results from temperature changes over time. Alternatively, the flexible straps may include means for forming a large plastic loop that is positioned about the links of the chain link fence so as to also permit some degree of movement of the plastic sheet after installation.

BRIEF DESCRIPTION OF THE DRAWINGS

The foregoing and other objects, aspects and features of the present invention will be more fully appreciated as the same becomes better understood when considered in connection with the detailed description of the present invention viewed in conjunction with the accompanying drawings, in which:

FIG. 6 is a perspective view of a portion of a chain link fence showing yet another alternate embodiment of the present invention in use thereon;

FIG. 7A is a front, plan view of the alternate embodiment of the plastic sheet illustrated in FIG. 6;

FIG. 7B is an enlarged view of a portion of the embodiment shown in FIG. 7A;

FIG. 7C is an enlarged end view of the embodiment of FIG. 7A;

FIG. 9 is a perspective view of a portion of a chain link fence showing yet another alternate embodiment of the present invention in use thereon;

FIG. 10 is a schematic representation of a side sectional view of the embodiment of FIG. 9;

FIG. 11 is plan view of a plastic strap fastener that may be used in an alternate embodiment of the present invention; and FIG. 12 is a schematic representation of a side sectional view of the embodiment of FIG. 9 but using the fastener of FIG. 11.

DETAILED DESCRIPTION OF THE PREFERRED EMBODIMENTS

Figure 1:
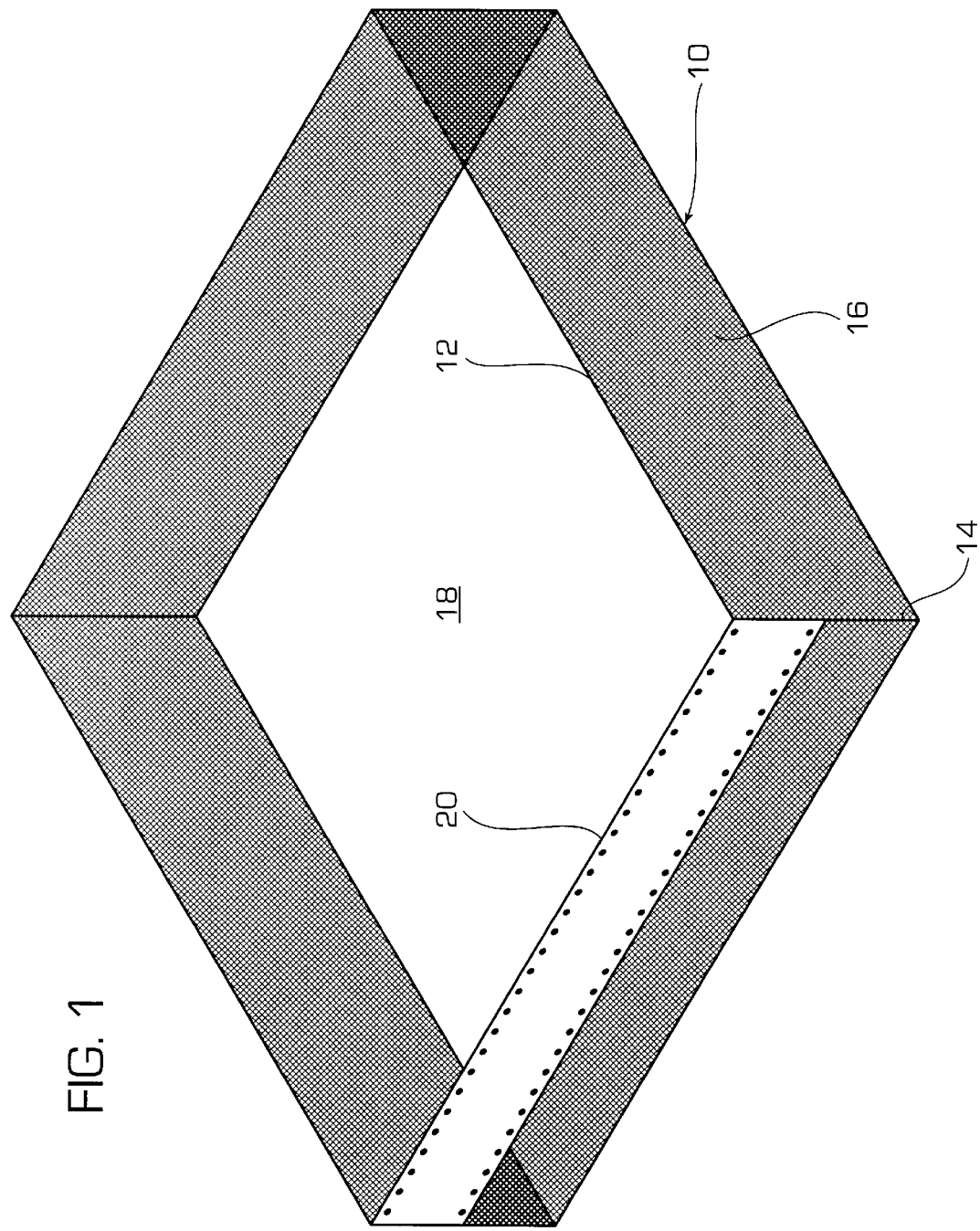
FIG. 1 is a perspective view of a typical chain link fence installation showing a preferred embodiment of the present invention.

Referring now to the drawings, wherein like reference numerals represent identical or corresponding parts throughout the several views, and more particularly to FIG. 1 thereof, a typical chain link fence is indicated generally by reference numeral 10. Chain link fence 10 comprises a horizontal top rail 12, a vertical corner rail 14, and crisscrossed chain links 16 extending therebetween.

Chain link fence 10 typically surrounds a high voltage power substation, the location of which is indicated generally by reference numeral 18. It is understood, however, that chain link fence 10 may comprise a different type of structure such as a wood fence or block wall, and that power substation 18 may comprise an alternate type of sensitive installation surrounded by fence 10.

In general, the purpose of fence 10 is to keep out unwelcome intruders including not only humans, but animals as well. As noted above, however, small, four-legged animals, such as squirrels or raccoons, can easily climb the links of a chain link fence so as to potentially wreak havoc inside the fence.

The present invention solves this particular problem by providing one or a plurality of plastic sheets 20 preferably mounted on the top portion of fence 10. In general, the plastic sheet 20 may typically be between 2 and 3 feet high and of indeterminate length. It preferably comprises a plastic material having a smooth, slippery outer surface. It is found that polyethylene works especially well, although PVC or nylon could also be used. The plastic sheet 20 is preferably on the order of 0.050–0.060 inches think, resulting in a semi-rigid sheet of material which is easy to handle, but presents a smooth, slippery surface upon which it is difficult, if not impossible, for small animals to gain a foothold.

As seen in FIG. 1, sheet 20 is preferably installed on the upper portion of chain links 16, although the lower portion of fence 10 could also be covered as well. The plastic sheet 20 may be attached to fence 10 by anchors, straps, or whatever attaching element might be suitable.

In accordance with an important aspect of the present invention, plastic sheet 20 is preferably prepunched to facilitate installation of same onto fence 10. By prepunching apertures in sheet 20, attachment of a mounting strap is facilitated, and the latter may be done either in the plant as part of the manufacturing process, or on site, as will be described in greater detail hereinafter.

Figure 2:
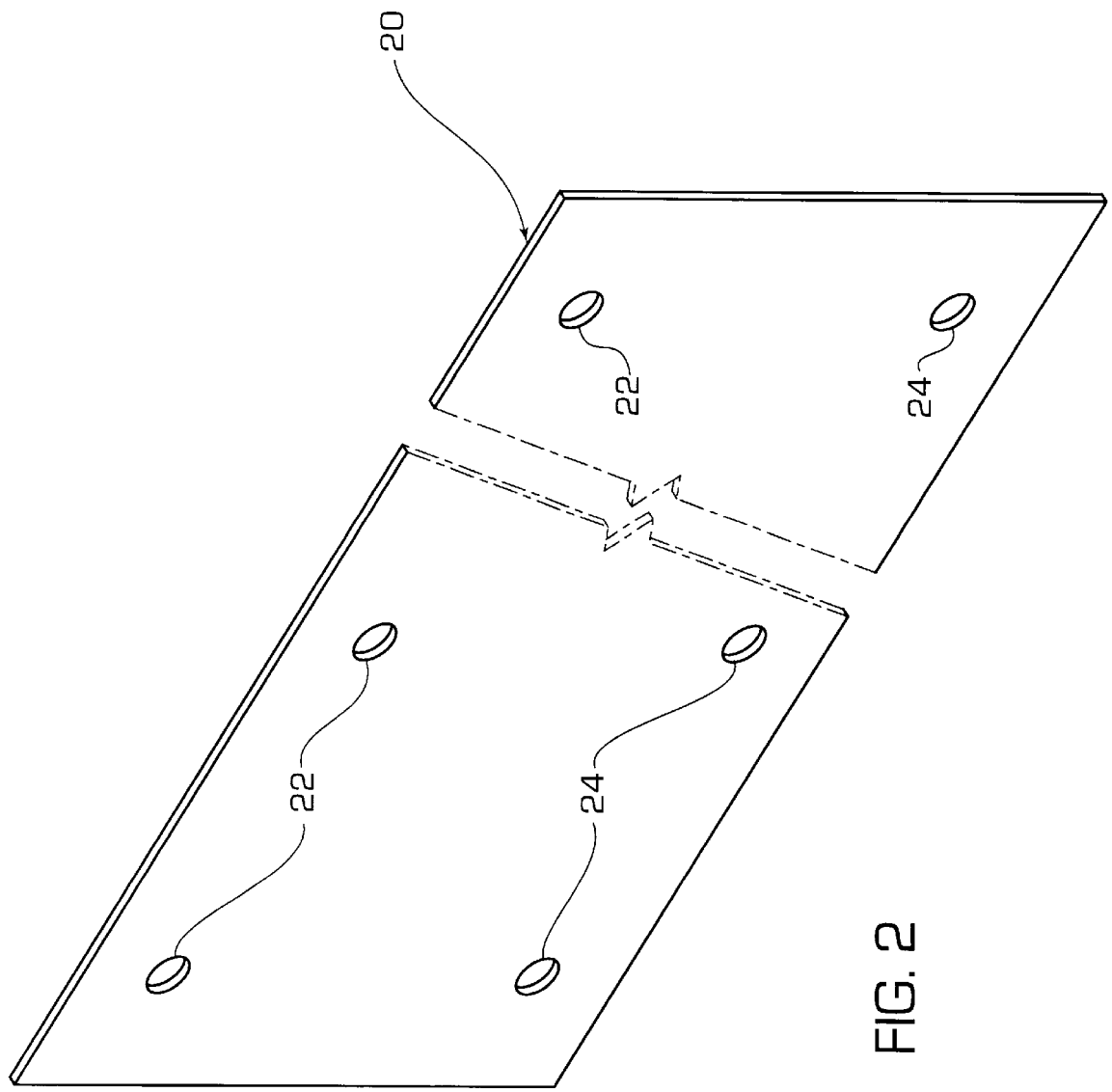
FIG. 2 is a perspective view of a first preferred embodiment of the present invention.

Referring now to FIG. 2, reference numeral 20 indicates one embodiment of a plastic sheet in accordance with the present invention, wherein a plurality of circular apertures 22 are provided along the upper edge of sheet 20. In addition, a plurality of circular apertures 24 may be provided along the lower edge of sheet 20 for securing same to the fence.

Figure 3:
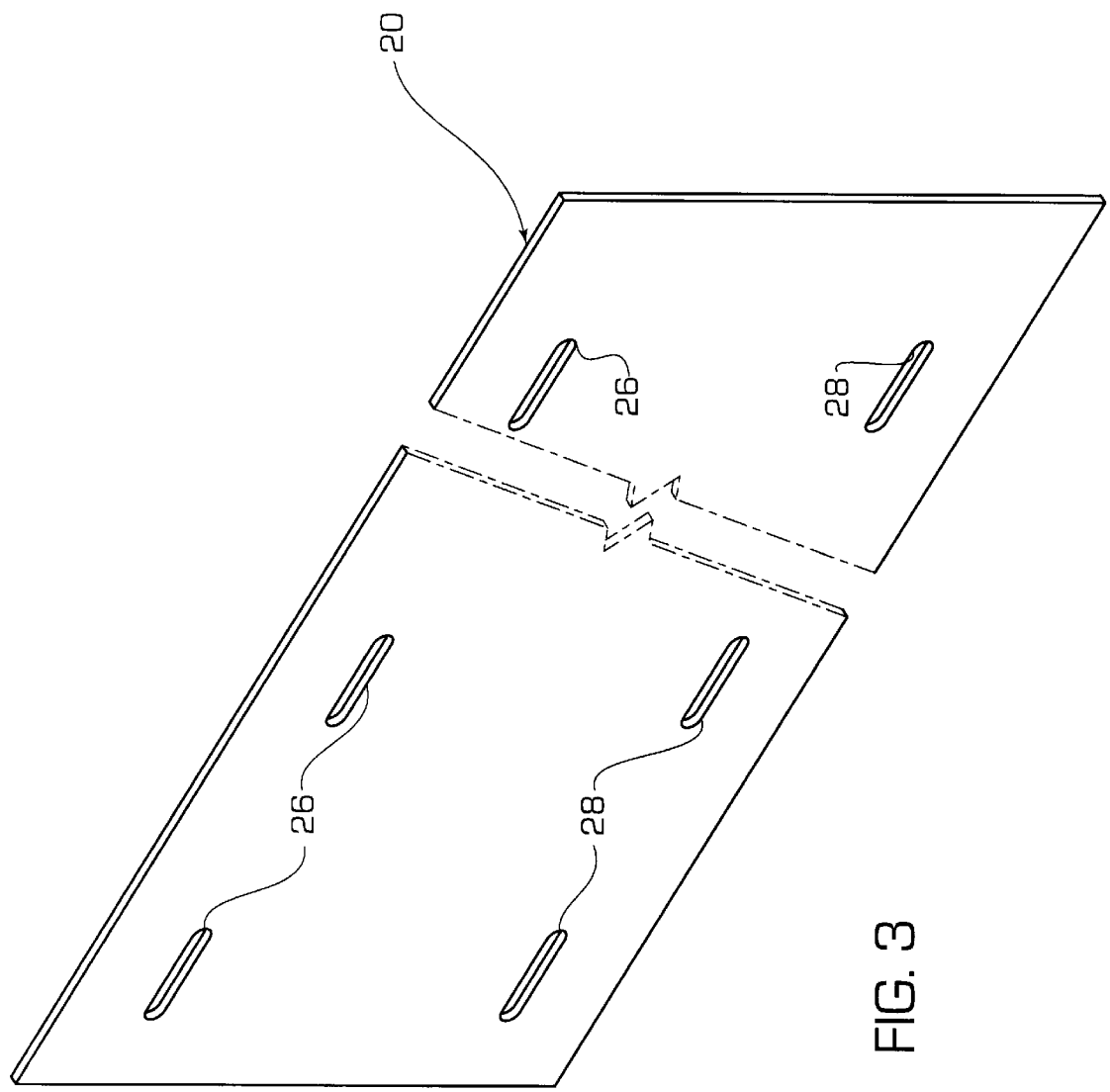
FIG. 3 is a perspective view showing a second preferred embodiment of the present invention.

FIG. 3 illustrates another embodiment of the present invention wherein plastic sheet 20 includes a plurality of elongated slots 26 positioned along the upper edge thereof.

In addition, a plurality of elongated slots 28 can be provided along the lower edge of sheet 20.

Figure 4:
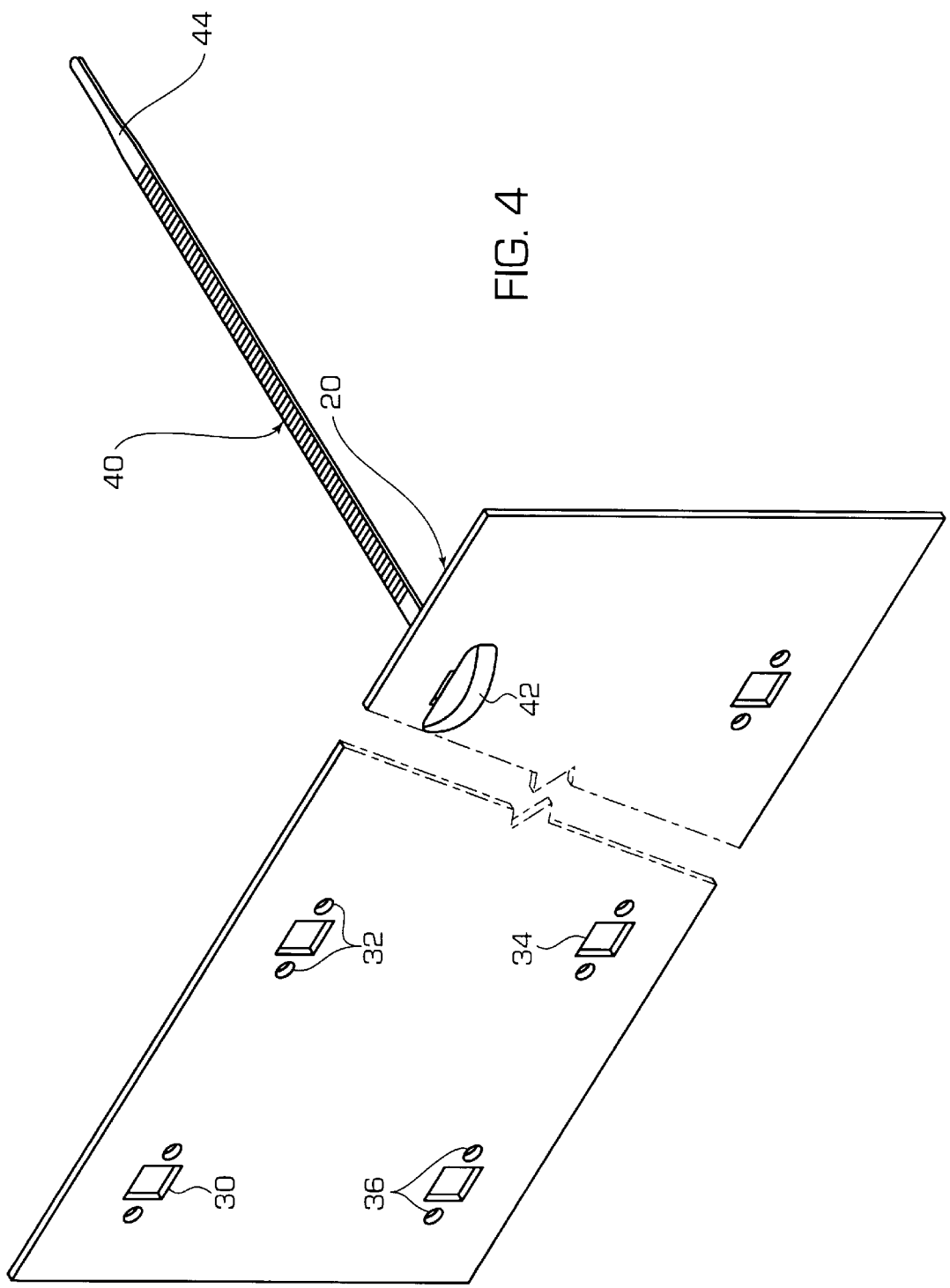
FIG. 4 is a perspective view showing a third preferred embodiment of the present invention.

Referring now to FIG. 4, there is illustrated yet another embodiment of the present invention wherein sheet 20 may be seen to include a plurality of aperture sets. Each aperture set includes at least one aperture of a medium to large size and at least one smaller aperture. For example, an aperture set may comprise a square aperture 30 on both sides of which are positioned a small, round aperture 32. Similarly, a square aperture 34 and small, round apertures 36 may be positioned along the lower edge of sheet 20.

Each such aperture set provides a means for mounting a plastic strap clamp which is indicated generally by reference numeral 40. Plastic strap clamp 40, an example of which is described in greater detail in copending application Ser. No. 08/926,868, filed Sep. 10, 1997, U.S. Pat. No. 5,848,771, (assigned to the same assignee as the present invention) typically includes a head 42 from which downwardly depends at least one small mounting foot (not shown) that fits within one of the small, circular holes 32 (or holes 36). Two such holes 32 are provided in the event clamp 40 is provided with two such feet. In addition, head 42 includes a central, downwardly extending square protrusion that fits within hole 30 (or hole 34) and from which extends a flexible plastic strap 44 the free end of which can be secured within head 42, all in a manner described in greater detail in said copending application, the specification of which is specifically incorporated herein by reference. It is possible to use any of a number of different designs of strap clamp type fasteners in lieu of clamp 40. For example, another possible plastic strap clamp is taught in U.S. Pat. No. 4,462,141, incorporated herein by reference and assigned to the same assignee as the present invention.

The advantage of the embodiment of FIG. 4 is that the plastic strap 40 may be preinstalled in the factory, so that the technician installing the plastic sheet 20 in the field does not have to worry about attaching the plastic strap 40 to the sheet 20. In other words, field installation of the sheet 20 onto the fence or other structure is greatly facilitated.

Figure 5:
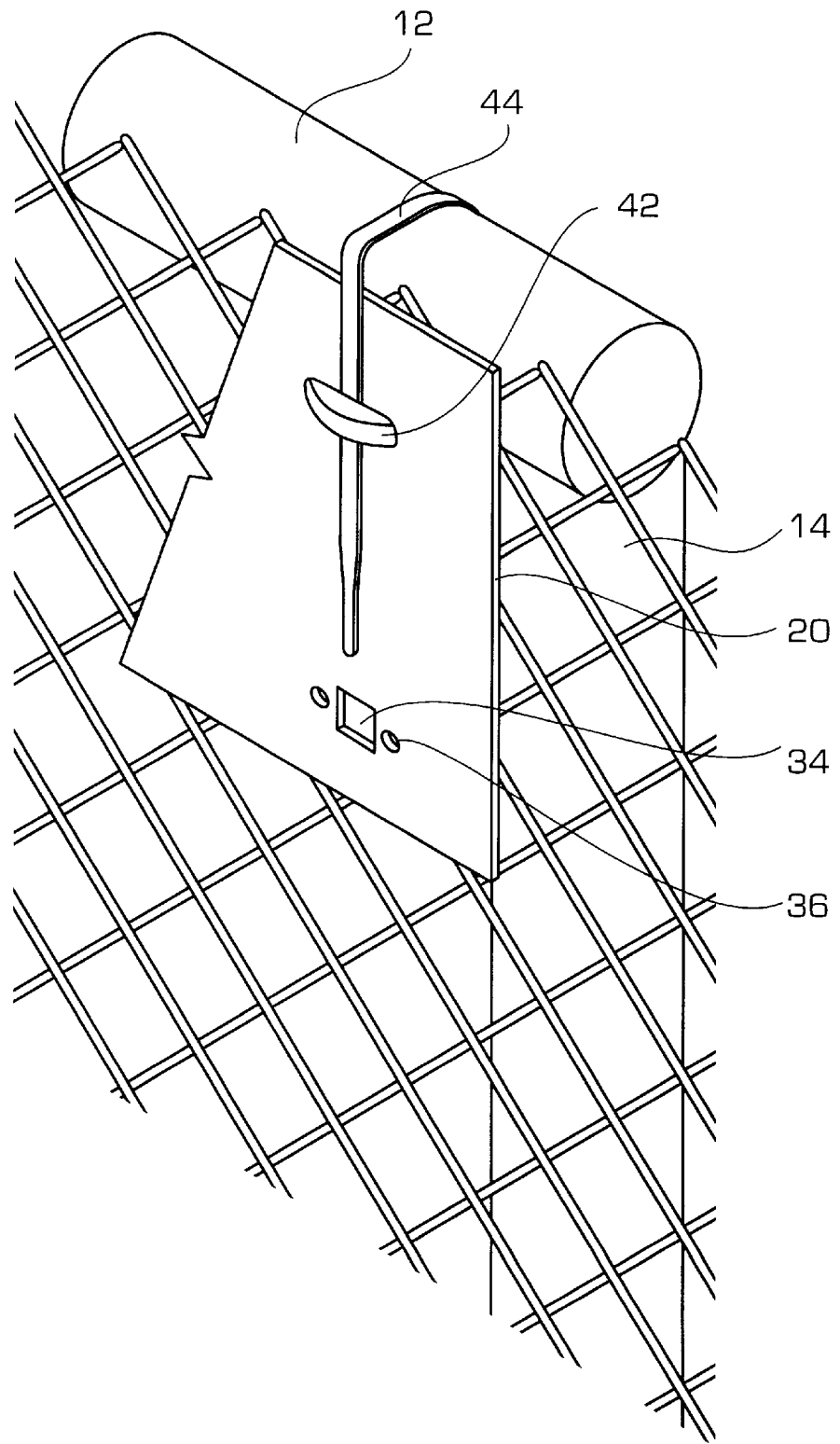
FIG. 5 is a perspective view of a portion of a chain link fence showing a portion of the third embodiment mounted thereon.

FIG. 5 shows a broken away, perspective view of chain link fence 16 and its horizontal and vertical posts 12 and 14, respectively. Also shown in FIG. 5 is a broken away corner of plastic sheet 20 from the embodiment of FIG. 4. FIG. 5 illustrates how strap 44 may be wrapped around horizontal post 12, and may then be threaded through head 42 of plastic strap 40 so as to secure plastic sheet 20 in place along the top rail 12. Note that the lower hole 34 may or may not be used, as the user desires.

FIG. 6 illustrates an alternate embodiment wherein sheet 20, instead of being secured to top rail 12, is secured directly to the individual links or cross-links 48 of chain link fence 16. In this embodiment, in addition to the apertures 34, 36 for securing the head 42 of fastener 40, there is an additional aperture 50 through which strap 44 extends after being looped around cross-links 48. Reference numeral 52 indicates the loop formed by strap 44 about cross-links 48. In this manner, the plastic strap fastener 40 secures sheet 20 to the outside surface of chain link fence 16 by direct attachment to the links 48.

It has been discovered that when plastic sheet 20 is subject to cold and hot temperature changes, vertical undulations or bulges tend to form along the length of sheet 20. In order to minimize the formation of such undulations or bulges, the plastic sheet 20 of FIG. 6 incorporates a pre-formed V-shaped groove 54 which extends horizontally along the width of sheet 20.

FIG. 7A illustrates a front, plan view of a slightly different embodiment of a plastic sheet 20 having a V-shaped groove 54 formed therein. As shown also in enlarged end view FIG. 7C, groove 54 may be formed either by a single crease 56 at the apex thereof, or by crease 56 plus two additional creases 58 and 60 formed at the junction thereof with the plane of sheet 20. It has been found that the presence of V-shaped groove 54 in this manner effectively prevents the formation of the undesirable temperature-change-induced undulations. Sheet 20 may be preformed with aperture sets 57 for receiving fasteners 40. In addition, this embodiment of sheet 20 includes planar portion 55, which is located above V-shaped groove 54, and lower planar portion 61, which is located below V-shaped groove 54. Both planar portions 55 and 61 are located in the plane of sheet 20.

FIG. 7B is an enlarged view of aperture portion 57' of FIG. 7A. Portion 57' includes a large square aperture 30 on both sides of which is a smaller hole 32 (like that shown in FIG. 4) for accommodating a plastic strap fastener 40. Aperture 50', located adjacent aperture 30, is adapted to receive strap 44 of fastener 40 after it has been threaded around links 48 of fence 16.

Sheet 20 may be typically provided in ten foot overall lengths, and the preferred spacing between aperture sets 57 is around 28 inches. The typical width of sheet 20 is 25 inches, while planar portions 55 and 61 are preferably 4 inches wide each. Another pair of apertures 63 may be provided at each end of sheet 20 to enable same to be fastened by a separate fastener (not shown) to the adjacent sheet to avoid creation of a foothold in an inadvertently formed space between adjacent sheets.

Figure 8:
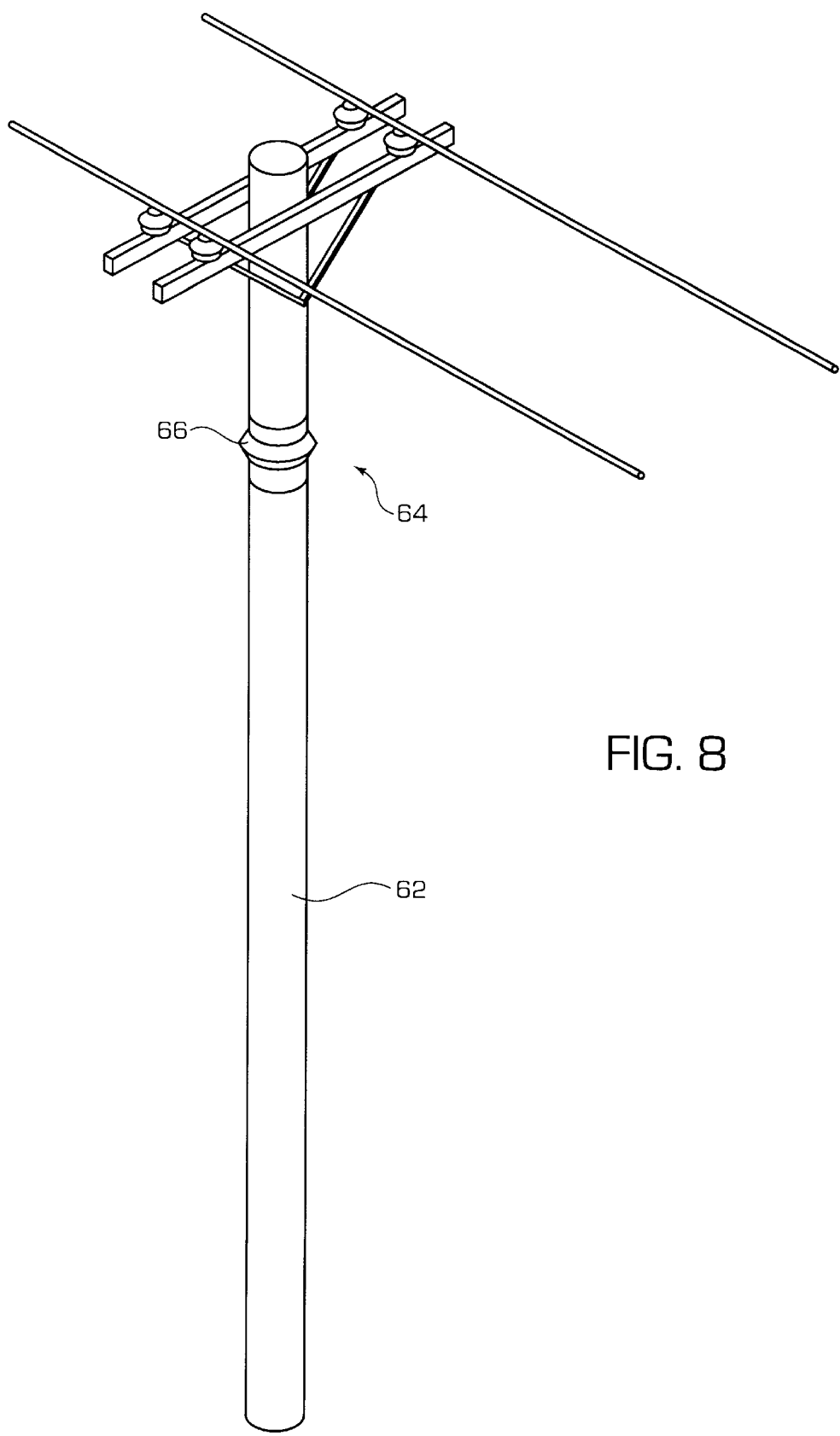
FIG. 8 is a schematic representation of the embodiment of FIG. 7A shown mounted on a utility pole.

FIG. 8 illustrates a utility pole 62 which suffers from a similar problem as the chain link fence of the previous embodiment. That is, certain animals may easily climb pole 62 to reach the electrical apparatus at the top of the pole. In this embodiment, therefore, a wildlife barrier 64 may be used to make it much more difficult for such an animal to climb to the top. Wildlife barrier 64 comprises a plastic sheet that is substantially similar to the wildlife barrier 20 of FIG. 6, except that sheet 64 may be provided in a curved shape so as to more readily fit around pole 62. Alternatively, sheet 64 may be manufactured so as to be sufficiently flexible to be curved around pole 62 during installation. Sheet 64 also has a smooth outer surface which makes it very difficult for an animal to gain a foothold. Sheet 64 also includes a V-shaped groove 66 extending horizontally therethrough for preventing the formation of vertical undulations in the sheet 64. In addition, prepunched holes, slots or other shapes may be provided in barrier sheet 64 to facilitate installation of same onto pole 62 by means of, for example, nails, anchors, locking tabs, screws, straps or other fasteners.

FIG. 9 illustrates an alternate embodiment which utilizes a different method to attach plastic sheet 20 to chain link fence 16. The embodiment of FIG. 9 resulted from the discovery that plastic sheet 20 undergoes thermal expansion between summer and winter that typically comprises nine inches of growth per 100 feet of sheet. The difficulty is that after such a sheet has been installed, such expansion could cause the sheet to try to separate itself from the fasteners secured to the fence. To alleviate this, the embodiment of FIG. 9 employs upper and lower backing strips 68 and 70 which are placed on the opposite side (inside surface) of chain link fence 16 to that on which plastic sheet 20 is located (outside surface). Backing strips 68 and 70 may be made of the same material and thickness as plastic sheet 20, and may be positioned in any convenient location so as to secure plastic sheet 20 in place. Normally, this would include the provision of at least an upper backing strip 68 which is positioned adjacent the upper edge of plastic sheet 20, and, in most cases, a lower backing strip 20 positioned adjacent the lower edge of sheet 20.

In this embodiment, a plurality of plastic strap fasteners 40 are pre-installed to the backing strips 68 and 70. In addition, plastic sheet 20 includes a plurality of pairs of slots 72 and 74 through which the loop 76 of strap 44 extends. As viewed from the inside surface of fence 16 (right hand portion of FIG. 9), slots 72 and 74 of sheet 20 are preferably positioned adjacent the central open areas between the links 48 of chain link fence 16. As seen more schematically in FIG. 10, this results in a central portion 78 of the strap loop 76 that is free to move between the confines of adjacent cross links 48' and 48", thus permitting some degree of movement of the plastic sheet 20 as well as backing strip 68 after installation. This permissible movement has been found sufficient to take into account thermal expansion of sheet 20 during temperature changes.

Referring now to FIG. 11, there is illustrated an alternate embodiment of a flexible plastic strap fastener 40, which includes strap 44 and head 42, that may be utilized to compensate somewhat for thermal expansion of plastic sheet 20 after installation. The plastic strap 40 of FIG. 11 is similar to that described in copending application Ser. No. 08/926,868, filed Sep. 10, 1997, U.S. Pat. No. 5,848,771, referenced above and specifically incorporated herein by reference. However, in the embodiment of FIG. 11, a pair of stop members 80 are positioned along the edges of strap 44 which limit the degree to which strap 44 may be pulled through head 42. This results, as seen in FIG. 12, in a relatively large plastic loop 82 being formed. The large loop 82 may then be threaded about the links 48" of the chain link fence 16. It is the large loop 82 that permits some degree of movement of the plastic sheet 20 as well as backing sheet 68 after installation.

Obviously, numerous modifications and variations of the present invention are possible in light of the above teachings. It is therefore to be understood that within the scope of the appended claims, the invention may be practiced otherwise than as specifically described herein.

We claim as our invention:

1. Apparatus used with a perimeter structure to prevent certain animals from climbing up the perimeter structure, which comprises:
   a sheet of plastic which may be mounted to the outer surface of said perimeter structure, said sheet of plastic being characterized by a smooth, slippery surface so that said animals are unable to obtain a foothold thereon;
   said sheet comprising an upper portion, a lower portion, and a central portion located between said upper portion and said lower portion;
   said upper portion and said lower portion being substantially planar so that said upper portion and said lower portion lay flat against the outer surface of said perimeter structure; and
   said central portion including means for minimizing the formation of vertical undulations in said sheet.

2. The apparatus as set forth in claim 1, wherein said plastic sheet includes aperture means preformed therein for permitting a fastener to be coupled thereto to enable said sheet to be mounted to said outer surface of said perimeter structure.

3. The apparatus as set forth in claim 2, wherein said aperture means comprises a first row of apertures formed in said upper portion.

4. The apparatus as set forth in claim 3, further comprising a second row of apertures formed in said lower portion.

5. The apparatus as set forth in claim 2, wherein said aperture means comprises a plurality of elongated slots.

6. The apparatus as set forth in claim 1, wherein said perimeter structure comprises a chain link fence.

7. The apparatus as set forth in claim 6, further in combination with fastener means coupled to said sheet of plastic to facilitate installation of said sheet on said chain link fence.

8. The apparatus as set forth in claim 7, further comprising a plurality of apertures preformed in said sheet, and wherein said fastener means comprises a plurality of flexible plastic straps attached respectively to said plurality of preformed apertures.

9. The apparatus as set forth in claim 8, wherein each of said flexible plastic straps is adapted to be looped around one or more links of said chain link fence for securing said plastic sheet thereto.

10. The apparatus as set forth in claim 6, further comprising a first backing strip which may be mounted on the inside surface of said fence adjacent said upper portion of said plastic sheet, and fastener means coupling said backing strip to said plastic sheet.

11. The apparatus as set forth in claim 10, wherein said fastener means comprises a flexible plastic strap mounted to apertures formed in said backing strip, and wherein said plastic sheet further includes apertures formed in said upper portion for receiving said flexible plastic strap.

12. The apparatus as set forth in claim 11, further comprising a second backing strip which may be mounted on the inside surface of said fence adjacent said lower portion of said plastic sheet, and a plurality of flexible plastic straps mounted to said second backing strip for securing said second backing strip to said plastic sheet through said fence.

13. The apparatus as set forth in claim 1, wherein said means formed in said plastic sheet comprises a V-shaped groove extending horizontally across said sheet.

14. The apparatus as set forth in claim 2, wherein said aperture means comprises a plurality of aperture sets, each of said aperture sets comprising at least one larger aperture and at least one smaller aperture located on one or more sides of said larger aperture.

15. The apparatus as set forth in claim 14, wherein said plurality of aperture sets are located in said upper portion.

16. The apparatus as set forth in claim 14, wherein said aperture sets each comprise a square aperture and a pair of smaller, round apertures.

17. The apparatus as set forth in claim 2, further in combination with fastener means coupled to said aperture means to facilitate installation of said sheet on said perimeter structure.

18. The apparatus as set forth in claim 17, wherein said aperture means comprises a plurality of apertures preformed in said sheet, and wherein said fastener means comprises a plurality of fasteners attached respectively to said plurality of preformed apertures.

19. The apparatus as set forth in claim 1, wherein said plastic comprises polyethylene.

20. The apparatus as set forth in claim 1, wherein said sheet is approximately 0.050–0.060 inches thick.

21. Apparatus, which comprises:
   (a) a sheet of semi-rigid plastic having a slippery outer surface, an upper portion, a lower portion, and a central portion located between said upper portion and said lower portion, said upper and lower portions being substantially planar so that said upper portion and said lower portion lay flat against the outer surface of a perimeter structure;

(b) apertures formed in said upper portion;

(c) fasteners coupled to said apertures of said plastic sheet for facilitating mounting of said sheet to the perimeter structure; and (d) means formed in said central portion for minimizing the formation of vertical undulations in said sheet.

22. The apparatus as set forth in claim 21, wherein said plastic sheet further comprises apertures located along said lower portion.

23. The apparatus as set forth in claim 21, wherein said fasteners each comprise a flexible plastic strap having a mounting head which is attached to said respective apertures.

24. The apparatus as set forth in claim 21, wherein said means formed in said central portion comprises a V-shaped groove extending horizontally across said sheet.

25. Apparatus, which comprises:

(a) a sheet of semi-rigid plastic having a slippery outer surface, an upper portion, a lower portion, and a central portion located between said upper portion and said lower portion;

(b) apertures formed in said upper portion;

(c) fasteners coupled to said apertures of said plastic sheet;

(d) a perimeter structure to a portion of which said sheet is mounted by means of said fasteners; and (e) a V-shaped groove formed in said central portion for minimizing the formation of vertical undulations in said sheet.

26. The apparatus as set forth in claim 25, wherein said sheet comprises polyethylene having a thickness between approximately 0.050 and 0.060 inches.

27. The apparatus as set forth in claim 25, wherein said perimeter structure comprises a chain link fence having an outer surface and an inside surface, said sheet of plastic being mounted on said outer surface, and wherein said fasteners each comprise a flexible plastic strap.

28. The apparatus as set forth in claim 27, wherein said flexible plastic strap is looped around the links of said chain link fence so as to fasten said plastic sheet thereto.

29. The apparatus as set forth in claim 27, further comprising a first backing strip mounted on said inside surface of said fence, said flexible plastic strap coupling said backing strip to said plastic sheet.

30. The apparatus as set forth in claim 29, wherein said flexible plastic strap is mounted to apertures formed in said backing strip, and wherein said apertures formed in said upper portion receive said flexible plastic strap.

31. The apparatus as set forth in claim 30, further comprising a second backing strip mounted on the inside surface of said fence, and a plurality of flexible plastic straps mounted to said second backing strip for securing said second backing strip to said plastic sheet through said fence.

32. The apparatus as set forth in claim 30, wherein said flexible plastic straps are positioned through the central open area between the links of said chain link fence so as to permit some degree of movement of said plastic sheet.

33. The apparatus as set forth in claim 30, wherein said flexible plastic straps include means for forming a large loop positioned about said links of said chain link fence so as to permit some degree of movement of said plastic sheet.

* * * * *